(12) United States Patent
Rothschild

(10) Patent No.: US 8,380,581 B2
(45) Date of Patent: *Feb. 19, 2013

(54) METHOD AND SYSTEM FOR CONDUCTING AN AUCTION OVER A NETWORK

(76) Inventor: Leigh M Rothschild, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,077

(22) Filed: Aug. 13, 2012

(65) Prior Publication Data

US 2012/0310767 A1 Dec. 6, 2012

Related U.S. Application Data

(63) Continuation of application No. 13/308,734, filed on Dec. 1, 2011, which is a continuation-in-part of application No. 11/899,073, filed on Sep. 4, 2007, now Pat. No. 8,090,623.

(51) Int. Cl.
*G06Q 40/00* (2006.01)

(52) U.S. Cl. ...................... 705/26.1; 705/26.3; 705/26.4

(58) Field of Classification Search .................. 705/26.1, 705/26.3, 26.4
See application file for complete search history.

(56) References Cited

U.S. PATENT DOCUMENTS

| | | | | |
|---|---|---|---|---|
| 6,671,674 | B1* | 12/2003 | Anderson et al. | 705/26.3 |
| 2002/0161690 | A1* | 10/2002 | McCarthy et al. | 705/37 |
| 2003/0028456 | A1* | 2/2003 | Yolles | 705/35 |
| 2003/0233246 | A1* | 12/2003 | Snapp et al. | 705/1 |
| 2006/0149659 | A1* | 7/2006 | Carone et al. | 705/37 |
| 2009/0222384 | A1* | 9/2009 | Rowan | 705/80 |

\* cited by examiner

*Primary Examiner* — Muriel Tinkler
(74) *Attorney, Agent, or Firm* — Atanu Das; Da Vinci IP

(57) ABSTRACT

A method and system for enabling a user or bidder to purchase an option on auction merchandise or services in an online auction are provided, thus allowing the option winner to purchase the merchandise in the event the original auction bidder (i.e., the highest bidder for the merchandise) defaults on his purchase. The method and system also provides an incentive to the users purchasing the option(s), e.g., bid optionees, by partially distributing the option pool of monies collected to the user who purchases the option at the price closest to the final auction price.

25 Claims, 6 Drawing Sheets

METHOD AND SYSTEM FOR CONDUCTING AN AUCTION OVER A NETWORK

CROSS-REFERENCE OF RELATED APPLICATIONS

The present application claims priority under the laws of the US including 35 USC 120 as a continuation of U.S. patent application Ser. No. 13/308,734 filed Dec. 1, 2011 which is a continuation-in-part application of U.S. patent application Ser. No. 11/899,073 filed Sep. 4, 2007, both of which are incorporated by reference in their entireties.

BACKGROUND

1. Field

The present disclosure relates generally to electronic commerce and online auction systems, and more particularly, to a method and system for allowing a user or participant in an online auction to take pricing options during the auction and for incentiving holders of the options.

2. Description of the Related Art

Online Internet auctions are now a major component of Internet commerce. Companies such as eBay Inc. of San Jose, Calif., uBid Inc. of Chicago, Ill., and Yahoo! Inc. of Santa Clara, Calif. conduct billions of dollars worth of online auctions on an annual basis. Merchandise and services of all sorts are regularly bought and sold through these and other auction web sites.

Generally, a seller of goods or services registers with one of the aforementioned web sites to create a user account. The seller then creates a listing for the item the user desires to sell. Typically, the listing will include a description of the item and one or several pictures of the item. The seller will then set a minimum starting bid price and optionally a reserve bid price, i.e., a secret minimum price the seller is willing to accept for the item. Finally, the seller will set a time period for which the auction will run, e.g., 7 days. During the time period of the auction, potential buyers or bidders will place bids on the listed item. After the auction time period has expired, the highest bidder will be awarded the item and will purchase the item from the seller, preferably, through an e-commerce transactions employing several available methods including PayPal™.

One of the challenges of the online auction communities is to make sure that the merchandise sold to the highest bidder actually gets paid for by the highest bidder. In many cases involving hundreds of millions of dollars each year, the highest bidder in an online auction will default and not pay for or take delivery of the merchandise/services he has bid on. A default on a winning auction bid means that the seller of the merchandise will not receive the money that he expected for the merchandise, and in many cases, must re-auction the goods or services.

SUMMARY

A method and system for enabling a user or bidder to purchase an option on auction merchandise or services in an online auction are provided, thus allowing the option winner to purchase the merchandise in the event the original auction bidder (i.e., the highest bidder for the merchandise) defaults on his purchase. The method and system also provides an incentive to the users purchasing the option(s), e.g., bid optionees, by partially distributing the option pool of monies collected to the user who purchases the option at the price closest to the final auction price.

According to one aspect of the present disclosure, a method for auctioning at least one item over a network is provided, the method including the steps providing a web site for presenting the at least one item for auction hosted by at least one server in communication with the network; receiving a purchase bid amount by the web site from at least one bidder; receiving at least one option bid amount by the web site by at least one bid optionee; awarding the at least one item to the highest at least one bidder; and distributing a first predetermined percentage amount of a total received at least one option bid amount to the at least one bid optionee upon completing a purchase transaction with the highest at least one bidder. The method further includes distributing a second predetermined percentage amount of the total received at least one option bid amount to the web site and distributing a third predetermined percentage amount of the total received at least one option bid amount to a predetermined number of subsequent bid optionees.

In another aspect, the method includes contacting a seller of the at least one item and confirming the purchase transaction is completed, wherein upon confirming the purchase transaction was not completed, presenting the highest at least one bid optionee to the seller for completing the purchase transaction.

In a further aspect, a cost of the at least one option bid amount is based on a percentage of a current purchase bid amount or based on a predetermined time range of the auction time period.

In yet another aspect, the first and third predetermined percentages are based on the purchase bid amount of the highest bidder or on a time the at least one option bid amount was placed during the auction time period.

According to another aspect of the present disclosure, a method for auctioning at least one item over a network includes the steps providing a first web site for presenting the at least one item for auction hosted by at least one first server in communication with the network; receiving a purchase bid amount by the first web site from at least one bidder; providing a second web site for monitoring the at least one item for auction hosted by at least one second server in communication with the network; receiving at least one option bid amount by the second web site by at least one bid optionee; awarding the at least one item to the highest at least one bidder; and distributing by the second web site a first predetermined percentage amount of a total received at least one option bid amount to the at least one bid optionee upon completing a purchase transaction with the highest at least one bidder at the first web site.

In a further aspect, an apparatus for auctioning at least one item over a network is provided including means for providing a web site for presenting the at least one item for auction hosted by at least one server in communication with the network; means for receiving a purchase bid amount by the web site from at least one bidder; means for receiving at least one option bid amount by the web site by at least one bid optionee; means for awarding the at least one item to the highest at least one bidder; and means for distributing a first predetermined percentage amount of a total received at least one option bid amount to the at least one bid optionee upon completing a purchase transaction with the highest at least one bidder.

In yet another aspect of the present disclosure, a system for auctioning at least one item over a network is provided. The system includes at least one first server in communication with the network configured for providing a first web site for presenting the at least one item for auction; at least one first client in communication with the network configured for transmitting a purchase bid amount to the first web site from at least one bidder; at least one second server in communication with the network configured for providing a second web site for monitoring the at least one item for auction; at least one second client in communication with the network configured for transmitting at least one option bid amount to the second web site by at least one bid optionee; the at least one server further configured for awarding the at least one item to the highest at least one bidder; and the at least one second server further configured for distributing by the second web site a first predetermined percentage amount of a total received at least one option bid amount to the at least one bid optionee upon completing a purchase transaction with the highest at least one bidder at the first web site.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A method and system are provided to allow users, e.g., bid optionees, of online auctions to take options on auction items, e.g., goods and services, for the purpose of alternatively completing the auction sale in the event that the winning or highest bidder defaults on completing the purchase transaction for the presented item. The method and system of the present disclosure provide an incentive to the option holders for participating in the auction by allowing the option holder whose option price comes closest to the winning and final auction bid price to share in monies collected for selling the options.

In utilizing the methods and systems of the present disclosure described herein, a user will be able to accomplish the various applications of the disclosure which are described below in relation to FIG. 1, which illustrates an overall flow diagram of the method and system 100 of the present disclosure.

Figure 1:
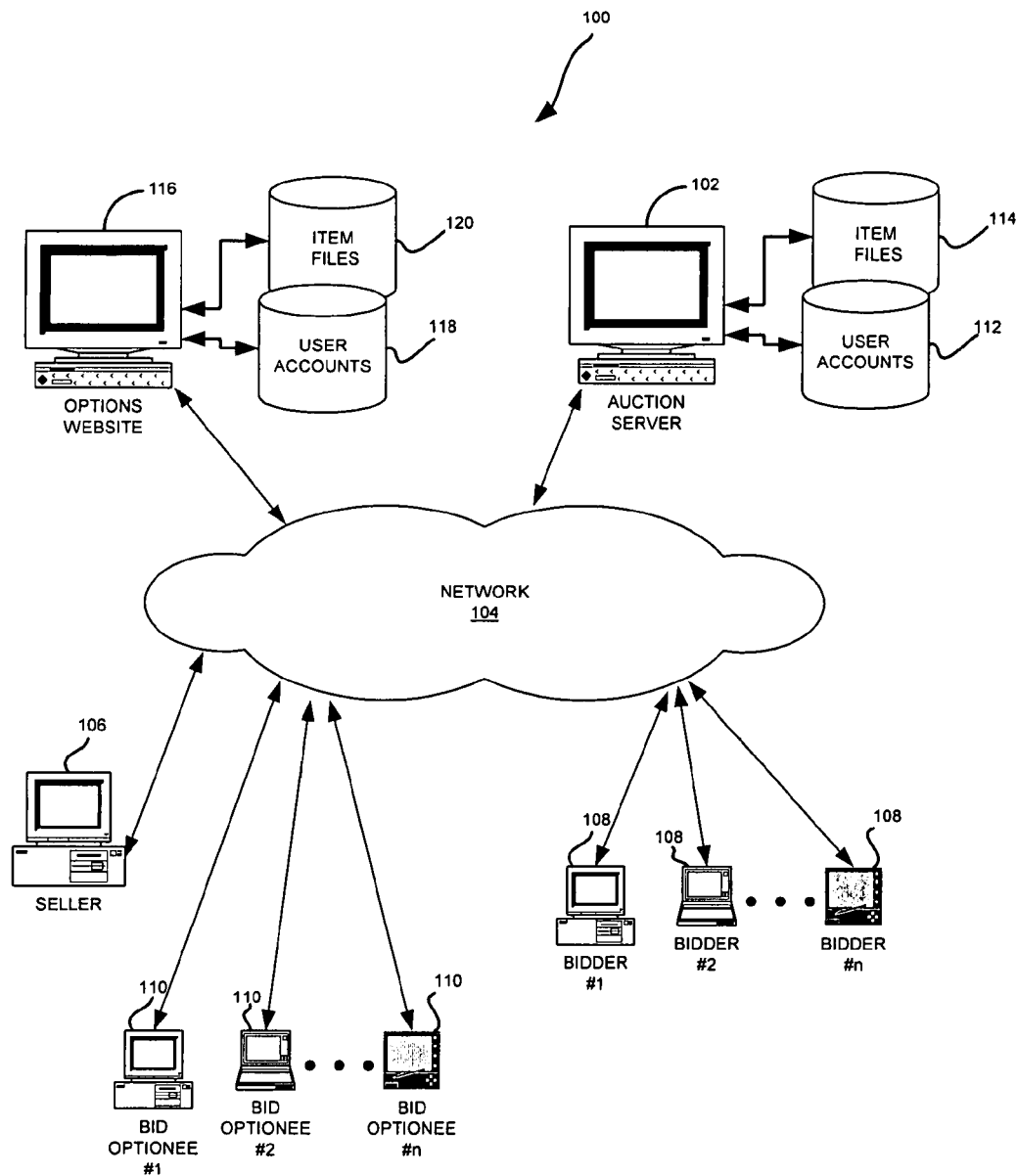
FIG. 1 is a flow diagram of a method and system for conducting an auction over a network in accordance with an embodiment of the present disclosure.

Referring to FIG. 1, an auction server 102 is provided for hosting an auction web site where sellers of items will post items for sale and potential buyers will bid on the items for sale. All transactions to be described will occur electronically, via a hardwired or wireless connection, over a network 104 of computers, e.g., the Internet. Each of the users of system 100, e.g., seller 106, bidder 108, bid optionee 110, will be coupled to the auction server 102 via a client application, e.g., an Internet browser, and will access the auction server 102 via a web interface, e.g., an HTML constructed web page. The auction server 102 includes a plurality of databases for storing user account information 112 and for item information 114 relating to the items presented or posted for sale. In using the system 100, a seller 106 will create a user account including name, address, contact information, e-mail address, acceptable payment options, etc. which will be stored for the seller in the user account database 112. Once the seller 106 establishes a user account, the seller 106 may post items that they desire to sell. When posting the item for sale, the seller 106 will provide a description of the item, one or several pictures of the item, a minimum starting bid price, and a time period for the auction. Optionally, the seller 106 may set a reserve price for the item. Once posted, potential buyers or bidders 108 may view the listing for the item and place a bid on the item, e.g., an amount the bidders is willing to spend to purchase the item. After the auction time period has expired, the auction server 102 will determine the highest bidder and contact the bidder to inform them that they are the highest bidder and provide them with instruction on how to complete the purchase transaction, preferably via an e-commerce method such as PayPal™.

The system 100 further includes an option server 116 hosting an option web site enabling bid optionees 110 to place option bids, i.e., what option price the user is willing to pay, on the items posted for sale on the auction website. The option server 16 will include a plurality of databases for storing user account information 118 and item option information 120. A bid optionee 110 will register with the option server 116 to be able to place option bids on items posted. The bid optionee 110 will provide such information as name, address, contact information including e-mail address, IM name, etc., preferred payment options which will be stored in the user account database 118. The option server 116 will store information related to each item being bid on in the items file database 120. Each item file will include an amount each bid optionee had bid, a total of the options purchased and various formulas or algorithms to determine a price of placing or purchasing the option bid, among other data relevant to the item being auctioned. In one embodiment, option server 116 will monitor the activity for a selected auction from auction server 102 and post the activity on the same web page where a bid optionee may place an option bid, using conventional software such as togo.ebay.com.

Figure 2:
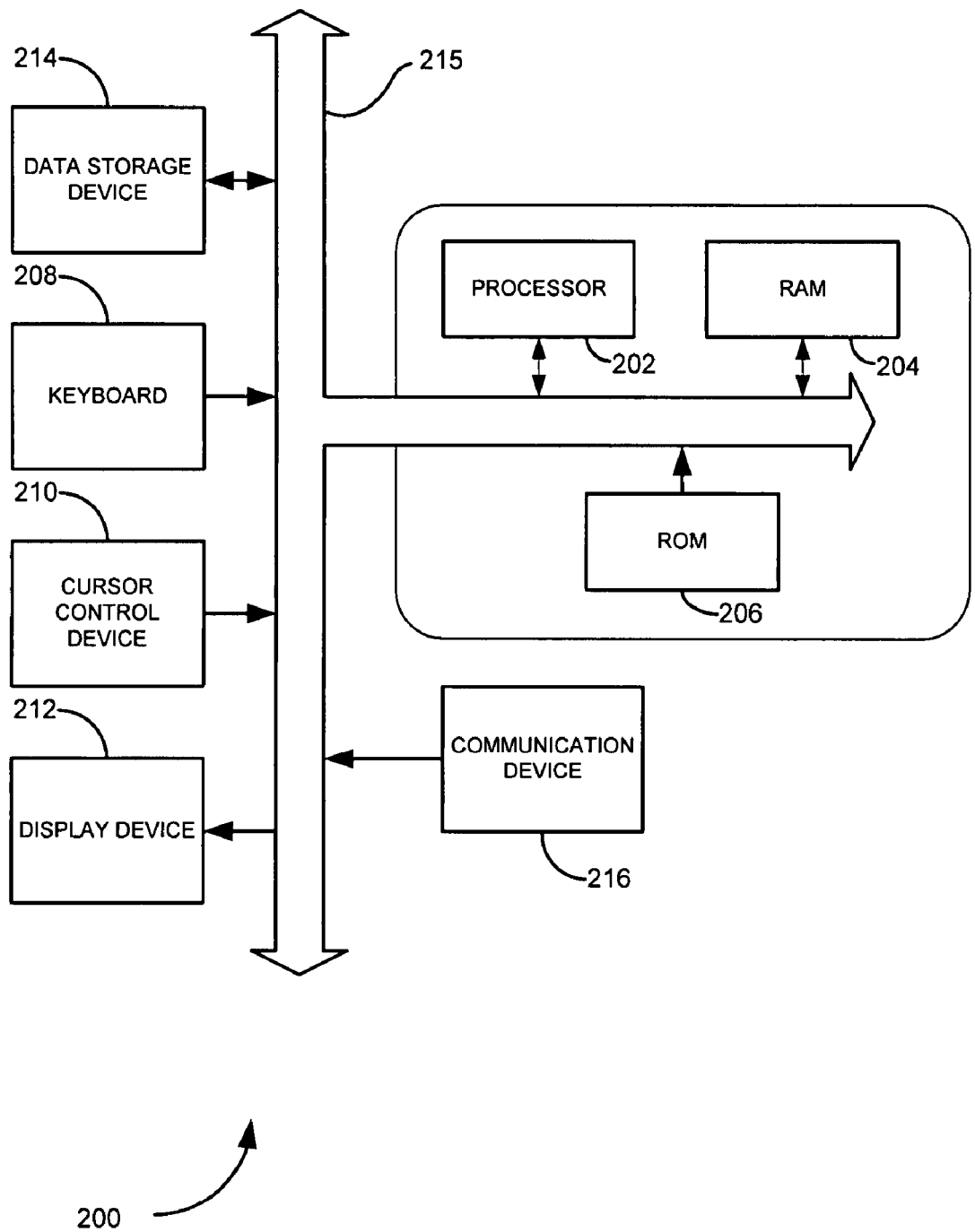
FIG. 2 is an exemplary server for use in the system shown in FIG. 1.

Although the auction server 102 and option server 116 are shown as two separate components, e.g., discrete hardware components, it is to be appreciated that the teachings of the present disclosure could be programmed to operate on a single server. It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine comprising any suitable architecture such as servers 102, 116. Referring to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. A system bus 215 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform by various interfaces and bus structures, such as a parallel port, firewire (IEEE 1394) serial port or universal serial bus (USB). One such peripheral device may include a communications device 216, e.g., a modem, network interface card (NIC), satellite relay, wireless connection, etc., for enabling communications from the servers 102, 116 to various clients, e.g., seller 106, bidders 108 and bid optionees 110. Other peripheral devices may include additional storage devices 214 and a printer.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The servers 102, 116 may operate in a networked environment using logical connections to one or more remote computers. The remote computer(s) may be a personal computer, a server, a router, a network PC, a peer device or other common network node, and typically includes many or all of the elements described above relative to the servers 102, 116. It is to be appreciated that the network may be a local area network (LAN), wide area network (WAN), the Internet or any known network that couples a plurality of computers to enable various modes of communication via network messages. Furthermore, the servers 102, 116 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

Figure 3:
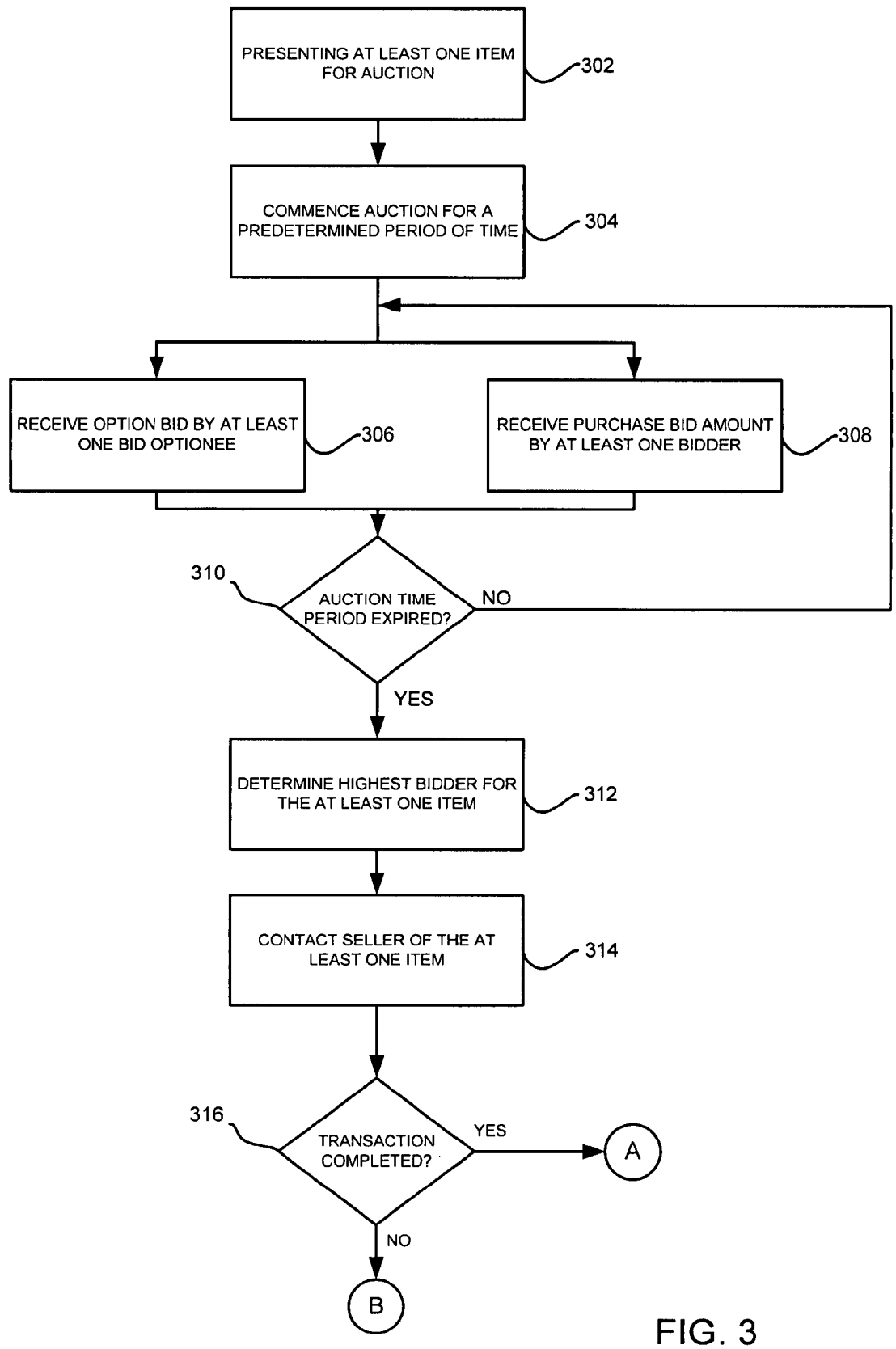
FIG. 3 is a flow diagram illustrating a method for conducting an auction over a network where users may purchase bid options on items for sale in accordance with an embodiment of the present disclosure.

With reference to FIGS. 1 and 3, the method and system of the present disclosure will now be described.

Initially, a user, e.g., a bid optionee 110, wishes to participate in an online auction process with the objective of securing an option on auction merchandise/services. This option will allow the user to purchase the goods (or services) in the event that the winner of the auction, e.g., a highest bidder 108, defaults on his bid. The bid optionee 110 registers at the option website 116 provided for his use or alternatively his account information is already on file in the user accounts database 118 residing on server 116. The bid optionee 110 will be able to follow the auction progress either from this website which will have the auction information posted on the auction that the user selects using software such as togo.ebay.com, or alternatively from the direct auction site, e.g. Ubid.com, Ebay.com, etc.

At step 302, an item, e.g., goods or services, will be presented for auction on the web site hosted by the auction server 102 as described above. Next, the auction will commence for a predetermined period of time (step 304). As described above, the auction period of time may be selected by the seller 106 or may be a default period of time determined by the auction server 102. Once the auction begins, potential buyers or bidders 108 may place bids via the website hosted by the auction server 102 for the item up for sale. As with conventional online auctions, there is no charge to place a bid on an item and a bidder may place several bids throughout the auction without being charged for placing the bids. Upon completion of the auction, the bidder that placed the highest bid is expected to complete a purchase transaction with the seller.

While the auction is open or the predetermined period of time has not expired, the bid optionee 110 may place or purchase at least one option bid (step 308). The bid optionee 110 will now commit an option bid to the online web site 116 that represents the user's or bid optionee's estimate of what the goods or services will sell for (or what option price the user is willing to pay). By example, if the auction is for a Rolex™ watch and the current bid price is $700 but the bid optionee 110 recognizes the value of the watch at $1400 and believes that the winning bid for the watch will be $1350 (or that the user is willing to pay $1350) then the user will place an option bid of $1350. This bid will be private between the bid optionee and the web site database that will contain this bid, e.g., item file database 120. The bid optionee 100 will now pay for the option by a standard e-commerce transaction allowing the subject web site 116 to debit his credit card or by using other payment means including Paypal, or electronic debit of a bank account, or by electronic checks, or wire transfers, etc. In one embodiment, the price that the bid optionee 110 pays for the option will be a defined percentage of the option price that the user is submitting. By example in the case of the watch auction where the user option bids $1350, the bid optionee 110 will pay 1% of this option bid price or a total of $13.50.

During the auction, other bid optionees 110 will also participate and option bid on the watch. After each person bids, the subject web site 116 will indicate how much in total option bids have been collected or received. This option bid total may be represented in numeric or text form and also in graphical form. In the above example, assuming 42 option bids were submitted from $300 to $2000 for the merchandise/services, then a total of $980.00 will have been collected by the subject web site in total option fees.

The option web site 116 will continue to monitor the bids placed by bidders 108 and collect option bids by bid optionees 110 until the auction period of time has expired (step 310). After the auction has been closed, the auction server 102 will determine the highest bidder 108 and will attempt to complete the purchase transaction between the seller 106 and bidder or buyer 108 (step 312). After a predetermined period of time, the option web site 116 will electronically contact the person (i.e., the seller 106) who auctioned the goods and ask them to confirm that the transaction was completed and the merchandise/services were paid for (step 314). This contact may be in the form of IM (instant messaging), e-mail, terrestrial mail, or any other form of communication that now exists or will exist in the future. If the transaction completed (step 316), then no further action will be taken in regards to the item up for auction and the method will proceed to FIG. 4 as will be described below. If, however, the transaction did not complete for whatever reason, then the option web site 116 will offer to replace the winning bid with the option bid that was placed, as will be described below in relation to FIG. 5. In this case, the option web site 116 will then notify the bid optionee to see if he/she is prepared to go forward and purchase the merchandise/services.

Figure 4:
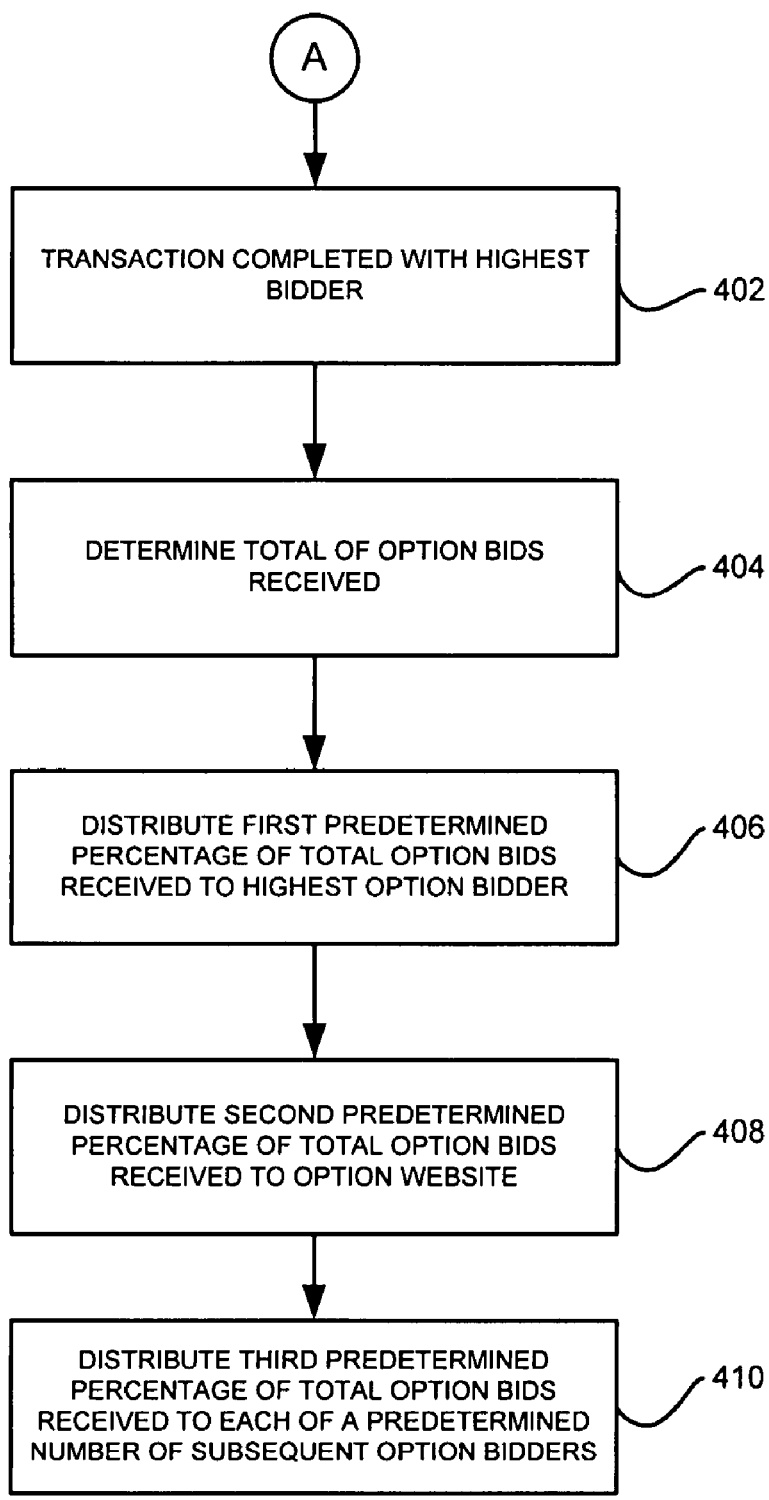
FIG. 4 is a flow diagram illustrating a method for distributing option monies collected when an auction transaction is completed with the highest bidder.

Referring to FIG. 4, a method is illustrated for the event that (A) the bid optionee cannot purchase the merchandise/services because the auction transaction was completed with the highest bidder (step 402). The option web site 116 will determine a total of option bids received (step 404) or retrieve this information from the item file database 120. In this case, the bid optionee 110 will receive a first X % percentage of the total option monies taken in or received to compensate him for the inability to buy the item, i.e., the merchandise/services (step 406). In the above watch auction example, where $980.00 was taken in, the bid optionee 110 would have received 50% of the total option fees collected or $490.00. Next, a second predetermined percentage of the total option bids received will be distributed to the option website (step 408). In this case, the additional option monies will be distributed so that 20% of the total ($196.00) will go to the website as its fee for acting on all parties behalf, and an additional 30%, of the monies ($294), or a third percentage of total option bids received, will be distributed equally to the next 10 bid optionees that came closest to selecting the final auction price (so that each one would receive $29.40) (step 410). Advantageously, the percentages for the distribution can be varied in any manner that the option web site 116 sees fit and this variance can occur in a static or dynamic fashion, e.g., based on a formula or external variables. For example, the percentages could be set by marketing formulas which provide an inducement (with a high percentage) to option the item. The percentages could also be determined by the type of merchandise being auctioned or even by the bid optionee identity. In the latter example, a frequent bid optionee would be rewarded by receiving a higher percentage then a first time or infrequent bid optionee.

Figure 5:
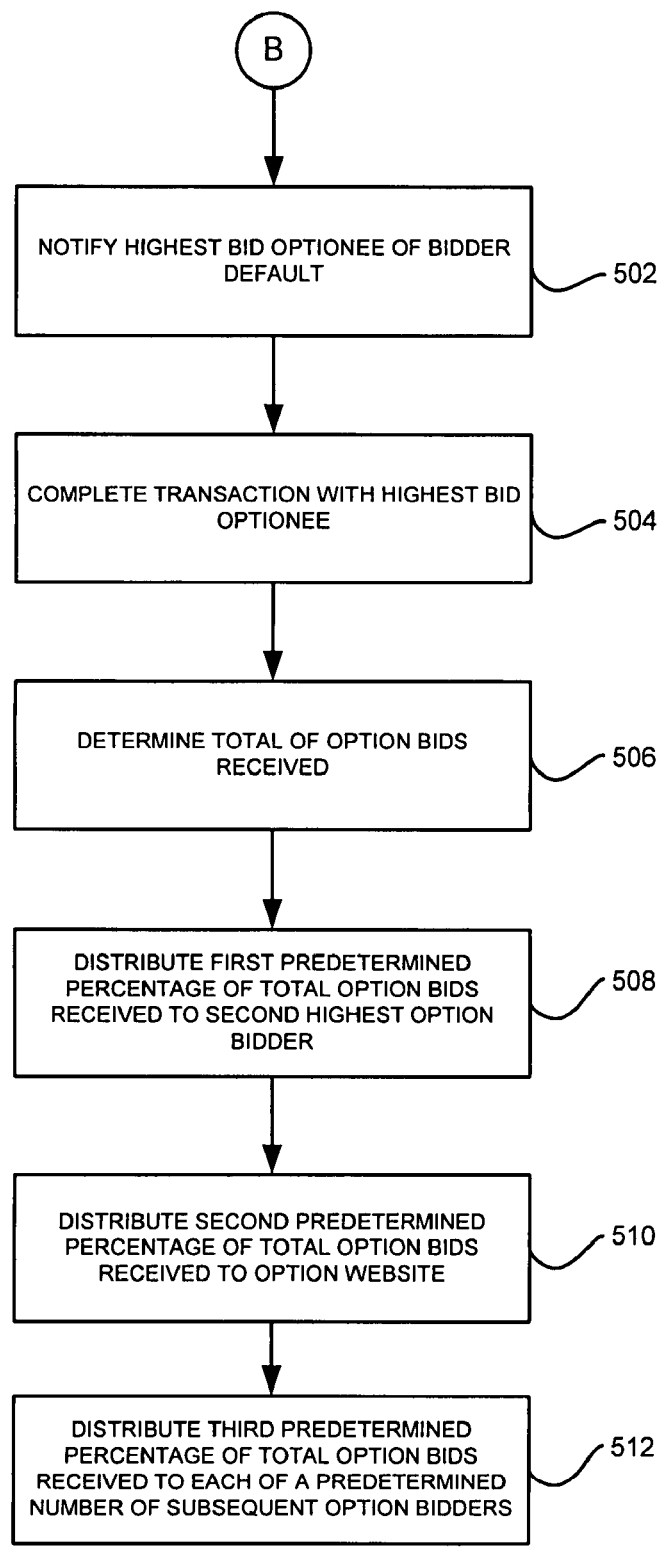
FIG. 5 is a flow diagram illustrating a method for distributing option monies collected when an auction transaction is completed with the highest bid optionee in accordance with an embodiment of the present disclosure.

Referring to FIG. 5, a method is illustrated for the event that (B) the bid optionee can purchase the merchandise/services because the auction transaction did not complete, as was verified by the option website 116. At step 502, the option server 116 will notify the highest bid optionee of the bidder default and that the item is available for the option bid amount. Next, the bid optionee 110 will complete the purchase transaction with the seller 106 (step 504). The option web site 116 will then determine a total of option bids received (step 506) or retrieve this information from the item file database 120. The monies received or collected from the option bids will then be distributed similar to that described above in relation FIG. 4. In one embodiment, the bid optionee will receive a lower percentage of the option fees or, alternatively, no percentage of the option monies since he will then be able to purchase the merchandise/services. If the highest bid optionee does not receive a distribution, the next highest bid optionee will receive the first predetermined percentage of the total option bids received (step 508). The balance of the option monies would be distributed by a second predetermined percentage to the website as its fee (step 510), and additionally to the other optionees that came closest to selecting the final auction price (step 512), e.g., a third percentage would be equally distributed to a predetermined number of subsequent bid optionees.

It is to be appreciated that many of the option bidders will want to place their option bid late in the auction process so that they can more clearly anticipate what the final price of the auction merchandise or services will be. Therefore, in a further embodiment, the option web site 116 will adjust the price of the option bid depending on the time left in the auction. In a preferred embodiment of this disclosure, the bid option web site 116 will use a formula to determine how much time is left in the subject auction, and the current bid price of the goods or services. Based on that information the bid option web site 116 will calculate the price of the bid option. For example, if a bid optionee wanted to place a bid option on a watch at the first hour of a 25 hour auction then the price of the option could be 1% of the auction price. In this case if the auction bid was $500 then the option price would be $5.00. In the event if the bid optionee wants to option again in the $23^{rd}$ hour then the price of the option could be 4% of the auction price or, in this case, if the auction price is $1000 then the price of the option would be $40.00. Furthermore, if the bid optionee wants to option bid in the last hour of the auction then the option price could be 8% of the auction price or, in the case of an auction price of $2000, it would cost the bid optionee $160.00 for the option bid. Of course the percentages used would be dynamic and set by the option web site 116 using algorithms to determine the settings.

In a further embodiment of the present disclosure, the bid option web site 116 may distribute the option money to the option winners (i.e., those persons that come closest to selecting the final auction price) based on the cost of the option and/or the time in the auction that the option bid was placed. Therefore, if the bid optionee 110 placed his option bid in the first hour of the auction, he would receive less of the distribution of the total amount of the option money collected then if he submitted his option bid in the last hour of the auction (and paid more of a percentage for the option bid). Similarly, if the bid optionee paid more for the option, he would receive more of a percentage of the total option monies collected. The percentages could be a combination of factors that can be algorithmically set by the processor of the option server 116 hosting the web site. Factors could include bid optionee identity, type of merchandise, seasonality, price scaling (if higher price range more or less could be paid), etc.

Figure 6:
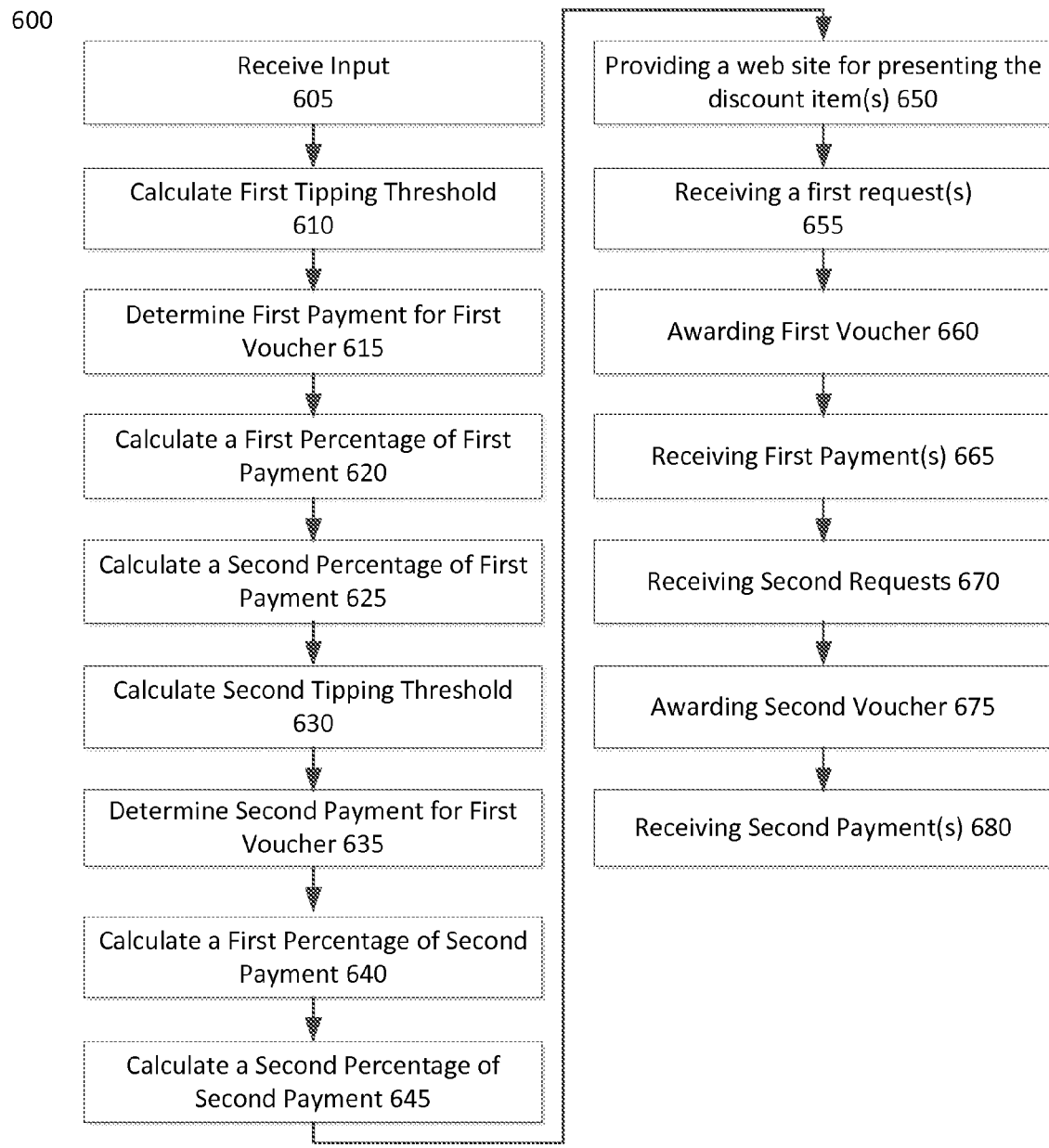
FIG. 6 is an exemplary flow chart illustrating and example method providing at least one discounted item.

FIG. 6 is an exemplary flow chart illustrating and example method providing at least one discounted item. A step in the example method may include receiving input by server regarding at least one discounted item provided by a merchant, as shown in block 605. The item may be a good or service and the data may be market data, inventory data, or business data that may include the price the merchant is willing to offer the discounted item. A further step in the example method may be calculating a first tipping threshold for the at least one discounted item based on the input using one or more software applications implemented by the processor, as shown in block 610. The operator of the server provides a service to users that includes offering a voucher or coupon for the discounted item. However, the voucher or coupon for the discounted item is not valid or activated until a certain amount of people select to purchase the discounted item. This certain amount of people may be called the tipping threshold. Further, the operator of the server may provide a first discount to a first set of users who select to purchase the discounted item and a second discount for a second set of users who select to purchase the discounted item. For example, the first set of users may be the first 100 users to select to purchase the discounted item and the second set of user may be the next 50 users to select to purchase the discounted item. Alternatively, the first set of users may be the users who select to purchase the discounted item within the first 24 hours the discounted item is offered/presented on the operator's website and the second set of user may be the users who select to purchase the discounted item within the next 48 hours.

An additional step in the method may be determining a first payment for a first voucher for the at least one discounted item using one or more software applications implemented by the processor on the server, as shown in block 615. The first voucher may be the voucher or coupon offered by the operator for the discount item to the first set of users. The price or payment for the first voucher is called the first payment. The price is typically a discounted price of the item for sale. The operator server in conjunction with the input from the merchant calculates the first payment based on the first tipping threshold as well as other business data associated with the discounted item (e.g. market, cost, profit, etc.).

Another step in the example method may be calculating a first percentage of the first payment to be awarded to the merchant, as shown in block 620, and a second percentage of the first payment to be awarded to an operator of the server, as shown in block 625, using one or more software applications implemented by the processor. The service offered by the operator provides revenue for the merchant as well as the operator. Based on the tipping threshold and the first payment, the merchant and the operator agree on splitting the revenue generated by the first payment. For example, the offered discounted item may be a massage treatment at a local spa. Typically, a massage may cost a customer $100. However, the merchant in conjunction with the operator may offer the first 100 users $50 for the massage treatment on certain days of the week. Further, the merchant and operator may offer the next (second) 50 users $75 for the massage treatment on certain days. Thus, the $100 may be designated as a first payment (and the $75 would be designated as a second payment). Further, based on analyzing the business data (market, cost, profit, etc.) the merchant and operator agree that for each $50 first payment, the operator may take 30% ($15) and the merchant may recoup 70% ($35). Moreover, for each $75 second payment, the operator may take 33% ($25) and the merchant may recoup 66% ($50).

A further step in the method may include calculating a second tipping threshold for the at least one discounted item provided by the merchant using one or more software applications implemented by the processor, as shown in block 630. Thus, in the spa example above, the second tipping threshold is the next 50 users who select to purchase the discounted item. An additional step in the example method may be determining a second payment for a second voucher for the at least one discounted item using one or more software applications implemented by the processor, as shown in block 635. The second payment in the above spa example would be $75 and would be based on the second tipping threshold as well as business data (market, cost, profit, etc.). Another step in the example method may be calculating a first percentage of the second payment to be awarded to the merchant, as shown in block 640, and a second percentage of the second payment to be awarded to the operator, as shown in block 645, using one or more software applications implemented by the processor. Thus, in the spa example above, the first percentage awarded to the merchant would be 66% ($50) and the second percentage awarded to the operator would be 33% ($25).

A further step in the example method may be providing a web site for presenting the at least discounted one item hosted by at least one server in communication with the network, as shown in block 650. Users may interact with the web site to view discounted items and select to purchase such items. An additional step in the example method may be receiving a plurality of first requests to purchase the at least one discounted item at a first discount by the server from each of at least one first users, as shown in block 655. Thus, in the spa example above, the first 100 users would be considered the first users. In another step, the operator via the server awards the first voucher to each of at least one first users when the number of the plurality of first requests exceeds the first tipping threshold, as shown in block 660. Thus, in the spa example above, once 100 users (e.g. first tipping threshold) select to purchase the massage treatment, the server sends them (via email, text, SMS, MMS, gift card, or in some other printed or electronic form) a first voucher for $50 for an $100 massage to be redeemed at a local spa. A further step may be receiving the first payment for the at least one discounted items based on the awarding the first voucher, as shown in block 665. Thus, in the spa example above, the server may then process a credit card provided by a user at the time the user selected to purchase the discounted massage treatment and receive the $50 payment, a portion of which will be split with the merchant.

An additional step in the example method may be receiving a plurality of second requests to purchase the at least one discounted item at a second discount by the server from each of at least one second users, as shown in block 670. In the spa example above, the second requests would be the next 50 users requesting a $75 massage treatment. Another step may be awarding the second voucher to each of at least one second users when the number of the plurality of second requests exceeds the second tipping threshold, as shown in block 675. Thus, in the spa example above, once the next 50 users (e.g. second tipping threshold) select to purchase the massage treatment, the server sends them (via email, text, SMS, MMS, gift card, or in some other printed or electronic form) a first voucher for $75 for a $100 massage to redeemed at a local spa. A further step may be receiving the second payment for the at least one discounted items based on the awarding the second voucher, as shown in block 680. Thus, in the spa example above, the server may then process a credit card provided by a user at the time the user selected to purchase the discounted massage treatment and receive the $75 payment, a portion of which will be split with the merchant.

Persons of ordinary skill in the art would recognize that the order of the steps shown in the example method may be performed in any order.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for auctioning at least one item over a network, the method comprising the steps:
    providing a web site for presenting the at least one item for auction hosted by at least one server in communication with the network;
    receiving a purchase bid by the web site from each of at least one bidder;
 receiving one bid by the web site from each of at least one bid optionee and a payment from each of the at least one bid optionee for placing the respective option bid;
    awarding, using a processor, the at least one item to the bidder who places the highest purchase bid; and
    upon completing a purchase transaction with the highest bid bidder having the highest purchase bid, distributing to the bid optionee who places an option bid the right to purchase a duplicate of the auctioned item,
    wherein the amount paid for the option bid is deducted from the price of the auctioned item.

2. The method as in claim 1, wherein one or more option bids are placed by a computer processor for the bid optionee in an automatic predetermined fashion.

3. The method as in claim 1, further comprising awarding the at least one item to the highest bidder having the highest option bid upon the highest purchase bid bidder defaulting.

4. The method as in claim 1, further comprising contacting by the web site a seller of the at least one item and confirming if the purchase transaction is completed.

5. The method as in claim 4, further comprising, upon confirming that the purchase transaction was not completed, presenting the bid bidder having the highest option bid to the seller for completing the purchase transaction.

6. The method as in claim 1, wherein the payment received from each of the at least one bid optionee is based on a portion of a purchase price for the one or more option bids.

7. The method as in claim 1, wherein the payment received from each of the at least one bid optionee is based at least on the time remaining before the end of an auction time period.

8. The method as in claim 1, further comprising presenting to the at least one bid optionee the total of the payment received from each of the at least one bid optionee.

9. The method as in claim 8, wherein the total amount is presented in numerical, textual, or graphical form.

10. An apparatus for auctioning at least one item over a network comprising: a memory; and, a processor configured to:
provide a web site for presenting the at least one item for auction hosted by at least one server in communication with the network;
receive a purchase bid by the web site from each of at least one bidder;
receive an one option bid by the web site from each of at least one bid optionee;
award the at least one item to the bidder who places the highest purchase bid; and
distribute, upon completion of a purchase transaction with the highest purchase bid bidder having the highest purchase bid, to the bid optionee who places an option bid the right to purchase a duplicate of the auctioned item,
wherein the amount paid for the option bid is deducted from the price of the auctioned item.

11. The apparatus of claim 10, wherein one or more option bids are placed by a computer processor for the bid optionee in an automatic predetermined fashion.

12. The apparatus of claim 10, wherein the processor is further configured to awarding the at least one item to the highest bidder having the highest option bid upon the highest purchase bid bidder defaulting.

13. The apparatus of claim 10, wherein the processor is further configured to contacting by the web site a seller of the at least one item and confirming if the purchase transaction is completed.

14. The apparatus of claim 10, wherein the processor is further configured to, upon confirming that the purchase transaction was not completed, presenting the bid bidder having the highest option bid to the seller for completing the purchase transaction.

15. The apparatus of claim 10, wherein the payment received from each of the at least one bid optionee is based on a portion of a purchase price for the one or more option bids.

16. The apparatus of claim 10, wherein the payment received from each of the at least one bid optionee is based at least on the time remaining before the end of an auction time period.

17. The apparatus of claim 10, wherein the processor is further configured to presenting to the at least one bid optionee the total of the payment received from each of the at least one bid optionee.

18. A system for auctioning at least one item over a network comprising:
at least one first server in communication with the network configured to provide a first web site for presenting the at least one item for auction;
at least one first client in communication with the network configured to transmit at least one purchase bid to the first web site from at least one bidder;
at least one second server in communication with the network configured to provide a second web site for monitoring the at least one item for auction;
at least one second client in communication with the network configured to transmit at least one option bid to the second web site from at least one bid optionee and further configured to transmit at least one payment to the second web site for the opportunity to place the at least one option bid;
the at least one first server further configured to award the at least one item to the highest at least one bidder; and
the at least one second server further configured to distribute by the second web site to the bid optionee who places an option bid the right to purchase a duplicate of the auctioned item,
wherein the amount paid for the option bid is deducted from the price of the auctioned item.

19. The system of claim 18, wherein the system is further configured to receive one or more option bids are placed by a computer processor for the bid optionee in an automatic predetermined fashion.

20. The system of claim 18, wherein the system is further configured to awarding the at least one item to the highest bidder having the highest option bid upon the highest purchase bid bidder defaulting.

21. The system of claim 18, wherein the system is further configured to contacting by the web site a seller of the at least one item and confirming if the purchase transaction is completed.

22. The system of claim 18, wherein the system is further configured to, upon confirming that the purchase transaction was not completed, presenting the bidder having the highest option bid to the seller for completing the purchase transaction.

23. The system of claim 18, wherein the payment received from each of the at least one bid optionee is based on a portion of a purchase price for the one or more option bids.

24. The system of claim 18, wherein the payment received from each of the at least one bid optionee is based at least on the time remaining before the end of an auction time period.

25. The system of claim 10, wherein the system is further configured to presenting to the at least one bid optionee the total of the payment received from each of the at least one bid optionee.

* * * * *